UNITED STATES PATENT OFFICE.

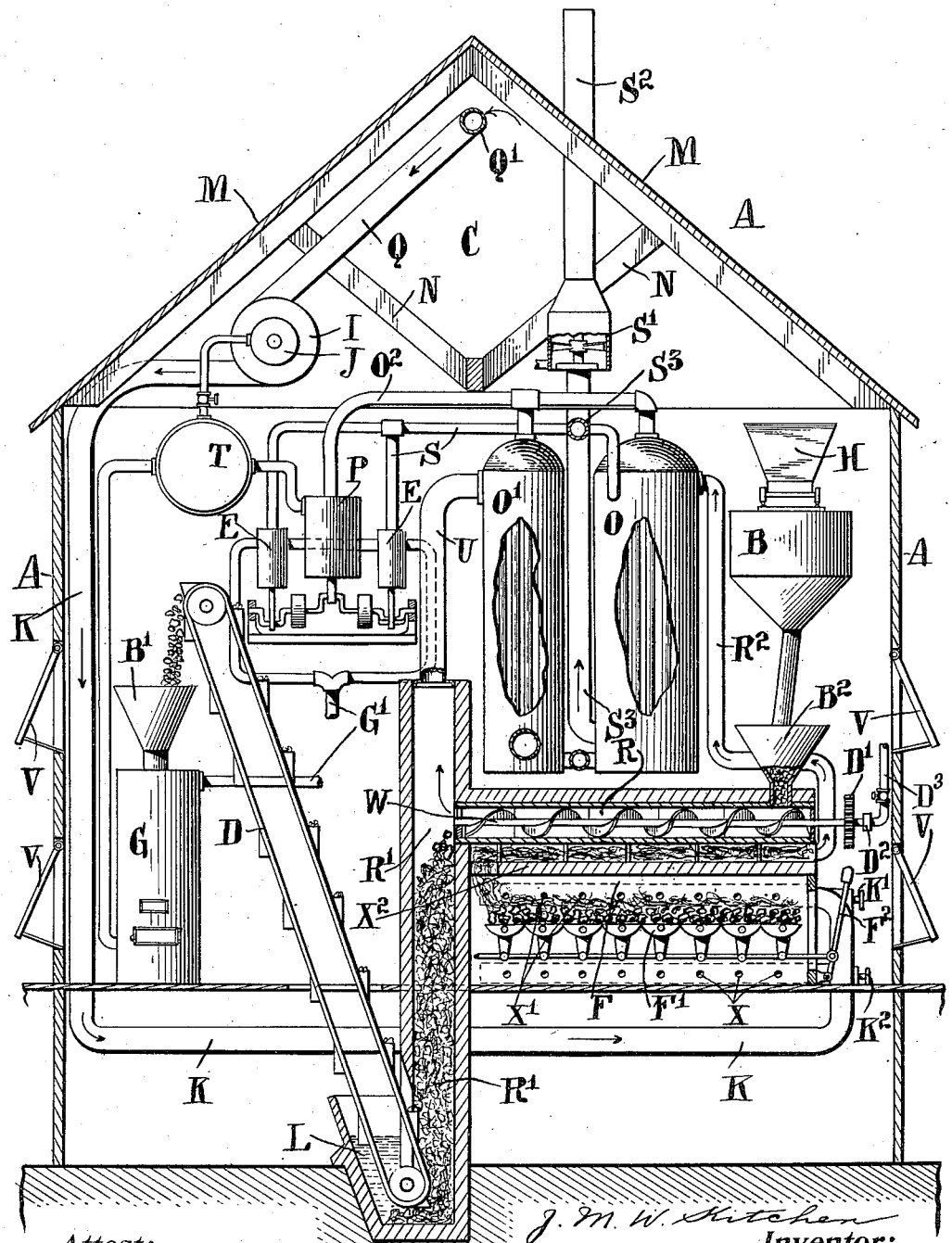

JOSEPH MOSES WARD KITCHEN, OF EAST ORANGE, NEW JERSEY.

MEANS FOR ECONOMIZING HEAT.

1,028,030.  Specification of Letters Patent.  Patented May 28, 1912.

Application filed February 14, 1908. Serial No. 415,983.

*To all whom it may concern:*

Be it known that I, JOSEPH MOSES WARD KITCHEN, a citizen of the United States, residing in the city of East Orange, county of Essex, State of New Jersey, have invented certain new and useful Improvements in Means for Economizing Heat, of which the following is a specification.

My invention relates to the economization of heat wastes in connection with many processes in the arts in which there are large wastes of heat due to radiation, due to poor combustion and defective transmission to power transmitting media of the heat generated, due to loss in exhaust steam and exhaust hot gases of combustion, etc. Such heat wastes occur in plants for the making of illuminating gas and in plants for the generation of power. In coal gas manufacture the heat wastes are very frequently over 75% of the heat units of the fuel used in heating the coal retorts, while less than 10% of the fuel used, is generally applied in generating power.

In ordinary power generation there are over 30 avenues through which heat wastes occur, most of which are practically preventable in a properly designed co-acting power generating system such as is here indicated and claimed. It would be confusing to try to describe and illustrate the means for closing more than a few of the most important avenues of waste in one application for a patent; and hence this present application will be restricted to claiming means for preventing the few wastes here referred to. Namely:

1. The waste of improper combustion and heat generation from the fuel used.
2. The waste of incomplete transmission of the heat generated.
3. The heat lost in creating so-called "natural draft".
4. The heat wastes of the internal combustion engine.
5. The waste of ineffective unification of power in the composite use of gas and steam power.
6. The waste of not uniting co-actively the process of gas making with the use of the gas coke as a power generating by-product fuel.
7. The waste of not using the heat lost in coal distillation in gas making.
8. The loss of heat experienced in the cooling of the coke product.
9. The loss of radiating heat.

In correcting the causes of these wastes, I apply certain principles, namely:

A. Composite generation of gas and steam power, utilizing the force of explosion in the internal combustion engine and steam generated from the heat wastes of the internal combustion engine.

B. Unifying the two forces without inducing unfavorable rates of rotation in either source of motive power, and securing smoothness of drive.

C. Co-active economization secured from the composite generation of power and heat for heating.

D. Utilizing specially prepared fuel secured by previous treatment, or by admixture of fuels to gain advantageous textures.

E. Gasifying tarry vapors by their exposure to high heat such as is radiated from incandescent coke, or to pre-heated non-combustible heating surfaces of very high temperatures.

F. Securing condensation of tarry contaminants of fuel or illuminating gas by special cooling of the condensing medium (air or water).

G. Cleaning the gas for use by washing or other means.

H. Progressively heating water with heat wastes of various temperatures, giving heat wastes of low temperature work to do of which they are capable, and reserving for heat wastes of high temperature the work to do of which high temperatures alone are capable.

I. Applying the vertical counter-current travel principle to the process of transferring heat.

J. Avoiding convection of heat to cool water, by applying the variously temperatured mediums bearing the waste heat, in several different heat interchangers.

K. Transferring waste heat of gases to water or air in heat interchangers under conditions which will prevent the loss of sensible heat due to expansion of gases or vapors.

L. Transferring to air, for combustion, heat of radiation of low degrees of temperature difficult or incapable of being absorbed by water in the process of highly heating the water in the generation of steam.

M. Utilizing the heated air in combustion processes in such manner as to secure an economic and substantially perfect combustion. This process has not before been practically accomplished.

N. Providing for a very high vertical or horizontal long run of burning gases before contact of the gases is allowed with heat absorbing surfaces, to secure substantially perfect combustion.

O. Coincident control in gas burning of the air introduced through the fuel, and by admixing the air with the gases volatilized from the fuel.

P. Control of draft by mechanical means of induction as well as forcing.

Q. Controlling draft by an arrangement and placing of furnace at a low level, and of the heat absorbing boiler at a high level; uniting the two with an elongated vertical conduit for securing time for the perfecting of combustion and the forcing of the hot gaseous products of combustion under some pressure through the heat absorbing boiler. In other words, introducing a draft producing chimney between the furnace and the boiler and securing through the ascensory buoyant effect of the very hot gases a complete absorption in the boiler of the heat of low temperature that is usually utilized for draft creating purposes in the chimney at the exit end of the heat absorbing boiler and after the gases have passed through the boiler.

R. Securing the progressive heating of air for combustion or respiration by means of transferring to the air successively the waste heat of progressively increasing degrees of temperature, but which is not otherwise utilizable.

S. Securing by one moderate expenditure of mechanical force the heat of air heated by waste radiated heat and a proper distribution of the air in effecting a relatively perfect combustion.

T. Utilizing the force of gravity in preventing the diffusion of heat in air bearing radiated heat.

These stated principles as applied in heat economization are exemplified in a system having for its purpose both the production of coal gas and the generation of power; and the following description and accompanying drawing show my invention as applied in such a system. In this system the policy is adopted of gasifying the cheapest fuels for coal gas production and of making coke in large quantities for use in power generation. I use the heat of the hot coke after its heating in the retort for the creation of water gas in the cooling of the coke and in transforming tarry vapor into fixed gas. I apply both the force of gas explosion and the heat of the explosion to create steam, and mechanically compress the steam, and use such mechanically compressed steam in the prime or other motors of the system. I use the coke without or with other admixed fuels, to make producer gas, which gas is used to create power for generating the electrical current. The exhaust steam developed in the system I re-use, after mechanical re-compression, as a power transmitting medium, for the making of producer gas and water gas for heating air, and for modifying the processes of combustion in the system. I use the heat that has passed through and beyond the heating flue of the gas retort, to generate steam, using that steam expansively in a motor, or for other purposes. I make economical use of the heat of radiation of the system and of escaped combustible gases and vapor, for combustion purposes in the furnace of the system.

The drawing illustrating my invention represents diagrammatically the application of the principles of the invention to a gas making and power generating plant, all the elements of which, in combination with my invention, co-act in securing economization of heat. For clearness, a number of structural features pertaining to such a plant are omitted in the drawing.

The reference characters represent as follows:

A is a building in which the plant is installed.

B is a coal bin.

$B^1$ is a coke hopper.

$B^2$ is a feed hopper to the retort R.

C is an apically pointed open space or concavity underneath the roof of the building A.

D is a coke conveyer.

$D^1$ is a gear wheel for actuating a fuel conveyer.

$D^2$ is a connection uniting a steam main $D^3$ with the interior of the fuel conveyer.

E is an internal combustion engine.

F is a furnace which is hand fired.

$F^1$ is a grate of the furnace.

$F^2$ is a handle for shaking the grate.

G is a producer gas generator.

$G^1$ is a gas duct leading to the gas engine of the system.

H is a coal car.

I is an induction and forcing fan for heated air.

J is a motor for actuating the fan I.

K is a hot air blast conduit.

$K^1$ and $K^2$ are valves for controlling air blasts.

L is a water seal at the bottom of a coke well.

M is a roof to the building.

N is a roof truss.

O is an economizer steam boiler.

$O^1$ is an economizer for the heat of newly formed gas, and a condenser of tar vapors.

$O^2$ is a steam conduit.

P is a pump for mechanically compressing steam.

Q is a conduit for heated air.

$Q^1$ is a heated air inlet duct.

R is a horizontally arranged gas distilling retort.

$R^1$ is a hot coke well.

$R^2$ is a waste gas conduit.

S is a conduit for waste gases.

$S^1$ is an induction fan, or draft accelerator.

$S^2$ is a waste gas stack.

$S^3$ is a horizontally projected waste gas conduit.

T is a steam accumulating storage tank.

U is a gas conduit.

V are ventilators.

W is a fuel conveyer.

X are under-grate air twyers.

$X^1$ are over-fire-mass air twyers.

$X^2$ is a fire brick arch.

This plant is designed to utilize the cheapest available coal for making coal gas and to produce much coke, the heat of the hot coke being used for fixing tarry vapors in the gas, and then in making producer gas, from which power is generated by the use of the producer gas in internal combustion engines. In coal gas production in this system, the method is suggested of conveying the coal continuously through the horizontally arranged retort R by means of a fuel conveyer, while the heat which is generated in the furnace F, which is located below the retort, has the first and highest degree of that heat applied at that part of the retort which is nearest the coke well $R^1$. The part of the retort which receives the highest heat would be made of fire clay, while the part of the retort which would not be heated above 1000° F. would be made of cast iron. The retort has a considerable horizontal elongation. The furnace F is intended for the use of the very cheapest kind of fuel, such as anthracite culm, and to secure a substantially perfect combustion of that fuel by a thoroughly controlled supply of heated air, which is conveyed through the twyers X and $X^1$ controlled by the valves $K^1$ and $K^2$. To secure the most perfect combustion the heated air which is supplied through twyer openings immediately above the fuel mass and controlled by the valve $K^1$ is forced in relatively large amounts above the fuel mass and only in sufficient amounts below and through the fuel to secure a volatilization of the fuel. The exit conduit $R^2$ is sufficiently small in size to secure a considerable compression of the gases in the combustion chamber of the apparatus by preventing the expansion of the burned gases. Under these conditions a very perfect combustion is secured at or close to the top level of the fuel mass in the furnace F." The fire arch $X^2$ prevents much loss of heat from the combustion chamber of the furnace until after combustion has been substantially effected. Air for combustion is drawn from the highest point of the apical concavity C underneath the roof to which the heated air is buoyantly conveyed, by means of the fan I actuated by the motor J. The concavity below the roof M, which is practically impervious to the passage of air, catches the air heated by radiated heat, the gases and vapors which rise from the various elements of the installation. The roof M, which is made of metal and preferably lined with some non-conducting fire-proof material, absorbs and transmits some of the heat of the sun's rays falling on the roof, conveying that heat to the air beneath the roof and which would be drawn in through apertures in the longitudinally arranged conduit $Q^1$, and thence down through the conduit Q through the motor actuated fan I, from whence it is forced through the conduit K to the twyers X and $X^1$, each row of twyers being controlled by an individual valve. The apical space C with its apex projected upwardly acts under the influence of gravity to secure the collection of the warmest air at the highest level and with the least possible diffusion of the heat. This warmest air spreads out horizontally along the peak of the roof and the horizontally placed conduit $Q^1$ has the heated air drawn into it through apertures along its entire length at the highest level of the apical space, and thus largely prevents further diffusion of the heat in the process of transferring the heated air to the furnace F.

The coal to be distilled, which for this special device must be non-fusing, is stored in the bin B and then fed through the hopper $B^2$ into the retort R, the rate of speed being controlled by the action of the fuel conveyer W. The rapidity of the action of this conveyer, which may be replaced by ordinary feeding appliances, would be governed by a mechanism not shown in the drawing, having connection with the gear wheel $D^1$. This conveyer is constructed so that its various parts which are subjected to high heat would be hollow, and steam is forced through the hollow parts in it in sufficient quantities to keep the structure of the conveyer from being damaged by the heat in the retort, the heated steam escaping from the end of the worm into the coke-well $R^1$. As the fuel is gradually conveyed by the action of the worm of the conveyer along the horizontal retort, it is progressively heated and its easily volatilized elements driven off, escaping into the upper part of the coke well $R^1$ where it is subject to the high heat from the incandescent coke in the well. By a modification of the structure illustrated, the gas may be conducted through the incandescent coke and highly heated to fix the tarry vapors. The rate of combustion in the furnace and the rate of travel of fuel through the retort are regulated so as to have the volatile elements of the fuel driven off before the coked fuel is precipitated into the coke well $R^1$. The special type of gas retort shown is not essential to the invention. Any ordinary form may be used, with slight modifications when fusing coal is used, it lies undisturbed in the retort until the volatile elements are driven off from the coke. As the coke in this well is conveyed away by the conveyer D, the hot coke as it descends to below the level of the water in the water seal L is cooled by the water in the seal, and the steam arising from such cooling passing up through the hot coke in the well, forms more or less water gas which unites with the coal gas evolved in the retort R, the mixed gases being conveyed through the gas conduit U and through the gas cooler and tar condenser and heat economizer $O^1$, from which it is conveyed to be cleansed and stored for illuminating or other purposes. With the economizing of the heat of the newly formed gas, my invention is concerned; but means for the disposition of the gas after its loss of heat is not related to my invention. The hot gas would be drawn or forced from a high level downwardly through the economizer $O^1$ through the instrumentality of a gas pump common in gas plants. Water would be passed upwardly through this economizer $O^1$ in vertical counter-current to the travel of the hot gas, and some steam may be formed from the water in its progress upward, while tar and water vapor condense on the outside of the water tubes. This economizer can be used merely as a water heater; and the water heated in it can be used as feed water for the boiler O. The feed water fed to the economizer $O^1$ may be refrigerated to secure condensation of any tarry vapors that may be left in the newly formed gas. The waste gases that have passed through the heating flue of the horizontal retort R would at first be drawn by the induction effect of the draft accelerator $S^1$ through the waste pipe $R^2$ to the top of the economizer O, thence down through that economizer to its bottom, thence upwardly through the gas flue $S^3$ which may be extended in length horizontally or otherwise through the upper part of the building A to secure an exhaustive radiation of the heat in the exhaust gases through the metallic sides of the conduit to the air in the cavity C, and are finally forced out through the waste stack $S^2$. When the plant is in full operation the heat in the conduit $R^2$ in connection with the blower I will force the gases through the economizer O without help of the fan $S^1$. The steam formed is conveyed to one or more vapor and steam compressing pumps P actuated by the internal combustion engines E. The steam, which is generated at a moderate or low pressure in the economizer O, is mechanically compressed in the pump P, being given added expansive force through its mechanical compression, and is forced into the storage and pressure equalizing tank T, from which it may be drawn at will to actuate steam-operated prime or other motors in the plant, or it may be used in modifying combustion processes either in the furnace F, in the producer gas generator G, for heating accessory supplies of air for combustion, or otherwise. The gas generator G may be of any suitable type suited to such fuel as may be used.

With the scavenging stroke of the engine E the exhaust gases are forced through the escape pipe S into the top of the economizer O, and traveling downwardly through the economizer, finally escape through the stack $S^2$ after having parted with much of their heat to the water and steam in the economizer O, and by radiation from the gas conduit $S^3$, to the air in the concavity C underneath the roof.

It should be understood that in radiating the heat from the several gaseous sources of waste heat in a plant of the type illustrated, I refrain from entirely exhausting the heat. It is desirable to leave a sufficient amount of heat in the gases to secure a natural exhaust draft of moderate extent, in order to prevent the escape of coal or producer gas, or of burnt gaseous products of combustion from the elements of the plant into the apartment housing the plant, and also for preventing the exhaust gases gravitating downwardly from the top of the exhaust stack. The gases are usually exhausted from the radiating conduits into the exhaust stack at a level where the temperature of the air is somewhat higher than the temperature of the outside atmosphere. I find that a difference of about 50° between the temperature of the exhaust gases and that of the outside temperature is sufficient to maintain this desirable natural draft. The construction of the draft accelerator $S^1$ is such that natural draft can operate through it while the draft fan is not operating.

From the description and the drawing, it will be understood that the waste heat from all the various features of the system is used regeneratively in cycle with very little loss of any of the heat; the various economies practiced, interweaving and co-acting in effecting a general economic result.

In the drawing, the proper height for the location of the economizers O and $O^1$ shown above the source of heat generation is not properly designated. My practice is to have the boiler located at a sufficiently high level above the heat generating furnace to secure the chimney draft effect of forcing the hot gases through the gas traversing passages of the boilers, and thus giving a certain degree of pressure of the heating gases against the heating surfaces of the boiler. It will be understood that any heat left in the gases after passing through the boilers is transferred to air for combustion by radiation from the gas conduits before the gases are exhausted through the stack $S^2$. It is also to be understood that by a proper placing of the various conductors radiating the waste heat, the various supplies of waste heat that are transferred to air for combustion are radiated at such several altitudes or zones that the air is progressively heated; first, by low degrees of waste heat, and then progressively heated by increasing degrees of waste heat, and finally given its highest heat by the waste heat from the highest source of waste heat, the air thus gradually becoming highly heated and then being used in the furnace of the system, being forced in desired amounts both below and above the fuel mass in the furnace.

The ventilators V permit any desired quantity of cool fresh air to enter the lower levels of the building, and allow for the exit of impure air not utilized for combustion purposes.

The present application discloses subject matter which is not herein claimed, but which is claimed to greater or less extent in each one of the following applications to which special attention is directed. These applications are: Serial No. 453,275 filed Sept. 16, 1908; Serial No. 460,267 filed Oct. 30, 1908; Serial No. 465,966 filed Dec. 4, 1908; Serial No. 482,127 filed March 8, 1909; Serial No. 487,694 filed Apr. 3, 1909; Serial No. 504,132 filed June 24, 1909; Serial No. 504,778 filed June 28, 1909, and Serial No. 551,196 filed March 23, 1910.

What I claim as new is:

1. The combination of (1) means for generating heat, said means radiating heat, (2) a structure comprising a habitable space, said means for generating heat being located in said space at a low level in said structure, the walls of said structure at the upper levels of said space being substantially impervious to gases and forming of the upper portion of said space a concavity for intercepting, concentrating and holding air heated by radiated waste heat, (3) means for admitting air for respiration and combustion in said space at a low level and for the exodus of vitiated air from the low level, whereby said air is maintained in healthful condition, and (4) means for drawing the heated air from the top of said concavity and for forcing said heated air to a place for use.

2. The combination of (1) an installation for the pursuit of an art, said installation comprising means for the generation of heat and comprising structure radiating waste heat and for the utilization of the radiated heat for purposes of combustion, (2) a building inclosing said installation, said building comprising a heat conducting and heat transmitting roof forming a concavity having an upwardly projected apical point beneath said roof for catching and holding heated air rising from said installation and for transmitting the heat of the sun to air beneath said roof, said combination comprising means for conveying said heated air from said apical point in said concavity to the means for the utilization of said heat for purposes of combustion, said building comprising means located at a low level in said building for ventilating the lower part of said building with fresh cool air.

3. The combination of (1) a building comprising therein a substantially imperforately roofed and walled concavity at a high level of said building for intercepting and holding risen air heated by the waste heat of radiation, and (2) a heat generating and heat radiating installation located at a low level of said building, said building comprising means for securing proper ventilation with cool fresh air under atmospheric pressure in the zone of said building usually traversed and occupied by workers in said building, said installation comprising means for utilizing the intercepted heated air.

4. The combination with a protective building, of (1) a heat generating installation radiating heat, (2) means located at a level higher than said installation for intercepting and holding air that has been heated variously and progressively by the heat generated and radiated from said installation, said means comprising means for automatically preventing diffusion of the highest heat with air heated by the radiated heat, and (3) means comprising a mechanically actuated exhauster and blower for drawing the intercepted most highly heated air from the place of its interception and holding and for conveying said heated air to a place for the utilization of said air for combustion processes.

5. The combination of (1) means for burning fuel, said means radiating waste heat, (2) means for intercepting and holding air that is heated by said radiated waste heat, (3) means other than said means for generating heat for burning a mass of solid fuel, and (4) means for the mechanical forcing and conveyance of and the control of said intercepted and held air and for the accurate admixture of said air with said fuel mass and the gaseous products of combustion from said mass in desired amounts, both below and above said fuel, whereby a perfected combustion of said solid fuel and of the gases volatilized from said fuel is secured and said radiated heat is regeneratively economized.

6. The combination in the installation of an applied art generating heat and radiating waste heat, of (1) a protective building for said installation, said building comprising means for the introduction of fresh air and for the exodus of respired air under atmospheric pressure into and from said building at a low level of said building and further means for intercepting and holding at a high level in said building air heated by the waste heat radiated by said installation, and (2) means for utilizing regeneratively the highest heat of said heated air for combustion, said building comprising means for automatically preventing diffusion of the heat in the air.

7. The combination of (1) a heat generating installation radiating heat, (2) a building housing said installation, said building comprising a roof and walls forming a concavity in said building at a level above said installation, said concavity comprising an apical part for collecting heated air heated by heat radiated from said installation, and (3) means for drawing the heated air from the apical part of said concavity and for forcing said heated air to a place of combustion for purposes of combustion.

8. The combination of (1) means for generating heat, said means radiating waste heat, (2) structure forming a concavity comprising an apical part at a high level of said concavity, said concavity and apical part collecting, accumulating and holding air heated by said radiated heat, said named elements being arranged and disposed so that air rising vertically to said concavity is primarily heated at a low level of the heat generating means and is then progressively heated by warmer heat radiating surfaces at higher levels, the heated air finding free passage to the level of the apical part of said concavity, and (3) means for inducing from said apical part a flow of the heated air and for forcing said heated air to a place of use.

9. The combination of (1) means comprising a fuel burning furnace for generating heat, said means radiating waste heat, (2) a housing for said means, said housing having a roof and walls forming a concavity below said roof with an apical part in the upper part of said concavity, said concavity collecting air heated by said radiated heat, (3) an air exhauster and blower for inducing and forcing a flow of air from said apical concavity, (4) an air conduit extending from said apical part to said air exhauster and blower, (5) an air conduit for connecting said exhauster and blower with said furnace, (6) means connected with said furnace for directing and distributing said heated air both below and above the fuel in said furnace, said last named means controlling the air forced through the fuel and securing the intermingling in numerous small currents of the heated air with the gases volatilized from said fuel, and (7) means for controlling the pressure of the heating gases in said furnace.

10. The combination with means for burning fuel, said means radiating waste heat, of (1) means for the generation of motive power from the unradiated heat of said combustion, and (2) means for the utilization of the heat generated and radiated but which is not transformed into motive power, said last named means comprising a combustion chamber and heat radiating means for the primary heating of air for combustion at the lowest level of said means for generating heat with the lowest degrees of heat not transformed into motive power and further means for the progressive heating of said air for purposes of combustion by radiated heat of higher degrees of temperature at successively higher altitudes or levels with a final heating of said air for combustion at a high level with the hottest degrees of radiated heat that is not transformed into motive power.

11. The combination of (1) means for generating a combustible gas, (2) a housing for said means, said housing comprising provision for intercepting and holding air heated by radiated waste heat from said combination, (3) an internal combustion engine for using said gas and generating motive power for use in said combination, (4) means for radiating and conveying to air for combustion low degrees of heat wastes generated in said combination but not used in generating motive power, and (5) means comprising an induction and forcing fan and a combustion chamber for utilizing the air heated by radiated heat in the process of combustion, said combination securing the regenerative use of waste heat.

12. The combination of (1) means for generating a combustible gas, (2) a structure housing said means, said structure comprising provision for intercepting and holding air heated by radiated waste heat that has been generated in said combination, (3) an internal combustion engine for using said gas and generating motive power, (4) means for generating steam under pressure from the heat wastes of the internal combustion engine, (5) a steam motor for using the steam, (6) means for uniting in useful work the motive forces generated by said internal combustion engine and generated by said steam motor, (7) means for radiating and conveying to air for combustion low degrees of heat wastes generated in said combination but not otherwise used, and (8) means comprising a combustion chamber and air feeding device for the mechanical conveyance and use of the intercepted and held air heated by radiated heat to a place of combustion for purposes of combustion in said combination.

13. The combination of (1) means for generating a combustible gas, (2) means for generating motive power from the burning of said gas, (3) means comprising an apically formed intercepting cavity for securing the undiffused transfer to air for combustion of radiated sensible heat generated by the two first named means, and (4) means comprising a combustion chamber for the application in useful work of the air heated by said transfer of heat made sensible in generating said combustible gas and in generating motive power from the burning of said gas.

14. The combination with means for heating air for combustion with low degrees of radiated waste heat, of (1) means for generating a combustible gas and making a coke product in the process of making said gas, said means comprising an air feeding device, a furnace and combustion chamber for utilizing the air for combustion heated with the low degrees of heat generated in the production of said gas and in generating motive power, (2) means for generating producer gas from said coke and for generating motive power from the buring of said producer gas, (3) means for generating steam from the heat wastes of said gas generation and from its burning and for generating motive power from said steam, and (4) means for unifying in work the motive power generated in the two sources of motive power.

15. The combination of (1) means for generating coal gas and making coke, (2) a water sealed coke well for cooling the coke, said cooling generating water gas, (3) means for heating air for combustion with the waste heat of the gas generation, (4) means for generating motive power from the gasification of said coke, (5) means for generating motive power from the heat wastes of said gas generation, and (6) means for unifying in work the two generated motive powers, said named elements comprising means for using regeneratively the heat wastes of low degrees of temperature generated in the process of gas generation and in generating motive power by heating air for combustion with said heat wastes, said first named means comprising an air feeding device, a furnace and a combustion chamber.

16. The combination of (1) means for radiating heat, (2) means for intercepting and holding air radiated by said heat and for preventing the diffusion of the heat in the air, said last named means comprising structure forming an apical concavity impervious to the passage of gases through its upper surfaces but open to the reception of rising heated air at a low level in said concavity, (3) means for inducing a downward flow of the heated air from said concavity and for forcing said air to a place of combustion for purposes of combustion, and (4) said place of combustion.

17. The combination of (1) a habitable building, said building comprising therein at a high level a concavity having an apical part, said concavity being incased above and at the sides by impervious walls and being so located that heated air can rise from below upward into said concavity and be held therein by the upward buoyant pressure of the heated air, (2) a heat generating heat radiating installation comprising a furnace and a combustion chamber located at a low level of said building and under said concavity, (3) an air conduit extending from the highest level of said concavity and said apical part to an air exhauster and blower, (4) said air exhauster and blower, and (5) an air conduit connecting said blower and said furnace for conveying heated air downwardly from the highest level of said apical part to and into the combustion chamber of said furnace.

18. The combination with an installation radiating heat, of (1) means located at a high level above the installation for intercepting, collecting and holding air heated by the heat of radiation of said installation, (2) means comprising a horizontal air conduit for mechanically exhausting and forcing the heated air to a place for use, said first named means comprising a concave space open below but being substantially impervious at the sides and top of said means to the passage of air, and (3) said place for use, said combination being constructed and arranged to capture substantially all the air heated by heat radiated from said installation and for using regeneratively the waste radiated heat of said installation.

19. The combination of (1) a heat generating installation comprising a combustion chamber, said installation radiating heat, (2) means comprising an apically formed concavity located at a level higher than said installation, said concavity intercepting and holding air that has been heated by the radiation of heat in said installation, (3) means comprising a mechanical exhauster and blower for conveying the intercepted heated air from the place of interception and holding, and (4) means comprising an air conduit for conveying said heated air from the blower to the combustion chamber and for the use in combustion of said heated air.

20. The combination of (1) a structure radiating waste heat, (2) means for intercepting and holding air heated by said radiated heat, (3) means comprising a furnace and a combustion chamber for burning a mass of solid fuel, (4) means for conveying to both above and to below said mass of fuel air heated by radiated heat for the regenerative use of the radiated heat in the burning of said mass of fuel, and (5) means for controlling the amounts of air respectively conveyed above and below the mass of fuel.

21. The combination of (1) a structural installation generating heat and radiating waste heat, said installation comprising a furnace and a combustion chamber, (2) a protective building for said installation, said building comprising means for the introduction of air for respiration into the building at atmospheric pressure at appropriate places for supplying and maintaining a supply of fresh cool air for the occupants of said building, said building comprising means for intercepting and holding respired air and air heated by the waste radiated heat of said installation, and (3) means for increasing the heat of the air primarily heated by radiated heat, said heated air being utilized by its use in said furnace and combustion chamber.

22. The combination of (1) a gas retort, (2) a furnace for heating the retort, (3) means for feeding compressed air under control both below the fuel mass and above the fuel mass in the furnace, (4) a vertical counter-current water heater for heating water with the exhaust hot gases escaping from said gas retort, (5) a gas conduit connecting the gas generator and the top of the vertical counter current water heater, (6) means for intercepting at a high level above said named elements air heated by the heat radiated from said combination, (7) means for conveying the heated air to an air exhauster and air compressor, (8) said air exhauster and compressor, and (9) an air conduit connecting the air exhauster and compressor with said means for feeding compressed air into said combustion chamber, said named parts being adapted for compressing air and securing a forced compression of the gases of combustion in said generator, furnace and vertical counter-current water heater, whereby a better combustion, transmission of the heat developed and a regenerative use of waste heat is secured.

23. The combination of (1) means comprising a furnace and combustion chamber for making coal gas and for making a coke product from the coal, (2) means for making producer gas from the coke product and further means for generating power from burning the producer gas, (3) means for generating steam from the heat wastes of the coal gas making, (4) means for utilizing the steam in generating motive power, (5) means for unifying in one form of work the motive force generated in the burning of the producer gas and from the use of the steam under pressure generated in said combination, and (6) means for economizing the radiated heat of said combination in heating air for combustion, said heated air being used in said furnace and said combustion chamber.

24. The combination of (1) a plurality of means for generating motive force, said means radiating waste heat of varying temperatures, (2) means comprising exhaust heat conduits horizontally placed for economizing the heat of varying temperatures in heating air for combustion, the air being first heated by the waste heat of lower temperatures at a low level of said combination, and then progressively heated by waste heat of progressively higher temperatures at progressively higher levels, with a final heating of the air by the waste heat of the highest temperatures at the highest level, and (3) means comprising a combustion chamber for using the air thus heated in securing combustion.

25. The combination of (1) means for the generation of a combustible gas, (2) means for the generation of motive power from the waste heat and escaped gases of said first named means, and means for intercepting air heated by radiant waste heat and intermixed with escaped gases or fumes other than air and for preventing the diffusion of the heat in gases and further means for the mechanical conveyance of said heated air in an undiffused state and of the escaped gases to a place for combustion for purposes of combustion, and (3) said place for combustion which comprises an air feeding device, a furnace and a combustion chamber.

26. The combination of (1) means comprising a combustion chamber for generating heating gases, (2) means for generating power from said heating gases and for exhausting the gases from said second named means, and (3) means for radiating to and heating air for combustion with the heat of the exhaust gases and for cooling the exhaust gases to a temperature slightly higher than the temperature of the atmosphere into which the gases are exhausted, whereby through the action of said combination is retained a sufficient natural draft for the gases, said heated air being utilized for purposes of combustion in said combustion chamber, said combination comprising a concavity having an apical high level part for concentrating and preventing diffusion of heat in air.

27. The combination of (1) means comprising a combustion chamber and furnace for heating a combustible through the process of distillation by applied heat, said means radiating waste heat and giving out offensive fumes and gases, (2) means for burning the combustible and for applying in work heat generated in burning the combustible, (3) means for intercepting air heated by the radiated heat of said combination and admixed with said offensive fumes and gases, and (4) means for conveying the intercepted air to said furnace and combustion chamber, whereby the heat of radiation is economized regeneratively and the offensive fumes and gases are decomposed by the heat in said furnace and combustion chamber.

28. The combination of (1) a furnace having a combustion chamber, (2) a gas distilling retort in operation relative to said furnace and means for transforming into fixed gas tarry vapors in the gas by subjecting the gas to high heat, (3) means for cooling the gas and condensing contaminants in the gas for freeing the gas from contaminants and for economizing the heat absorbed from the gas in cooling, (4) means for generating motive power from the sensible heat of the new gas generated in said combination, and (5) means for securing the heating of air for combustion with heat radiated from said combination, said heated air being utilized in the combustion chamber and other parts of said furnace.

29. The combination of (1) a gas generator comprising a furnace and combustion chamber, said generator generating a combustible gas, (2) an internal combustion engine for burning the gas generated, (3) means for heating air for combustion with the low degrees of waste heat of the gas making and gas burning, (4) means for the further heating of the heated air for combustion with waste heat of high temperature, (5) means for utilizing in work air heated by sensible heat generated in the complete combustion of fuel in said furnace and combustion chamber.

30. The combination of (1) means for freeing coal from tarry matters and sulfur by the influence of high heat, whereby is produced a fuel coke especially suited for the generation of fuel gas and power generating gas, (2) a producer gas generator for generating gas from the coke, (3) an internal combustion engine for burning the gas and generating motive power, and (4) means for utilizing the sensible heat of gas generated in the high heating of the coal, said last named means comprising provision for generating steam under pressure from the heat wastes of the combination, said combination being adapted for heating air for combustion with the low degrees of heat evolved in said combination, and for utilizing the heated air for purposes of combustion.

31. The combination of (1) a furnace and combustion chamber, (2) a boiler for heating water with the higher degrees of heat of the hot gases from the combustion chamber, (3) a horizontally arranged gas conduit for radiating the lower degrees of heat of the hot gases that have not been absorbed in said boiler and for heating air with said heat, said conduit connecting said boiler and an exhaust stack, (4) said exhaust stack, (5) means for conveying the air heated by the heat radiated from said combination to said furnace and combustion chamber for purposes of combustion, and (6) means for introducing at a low level of said combination fresh cool air, said fresh cool air being progressively heated in said combination and then used in said furnace and combustion chamber and finally exhausted through said stack.

JOSEPH MOSES WARD KITCHEN.

Witnesses:
C. C. BURDINE,
GEO. L. WHEELOCK.